United States Patent [19]

Rossato et al.

[11] Patent Number: 4,669,257
[45] Date of Patent: Jun. 2, 1987

[54] LIFTING DEVICE FOR PICK-UP ROLL BALER MACHINES FOR ALL TYPES OF HARVESTING

[75] Inventors: Charles L. Rossato; Loïc M. Renaud, both of Coex, France

[73] Assignee: Société Hesston S.A., France

[21] Appl. No.: 614,254

[22] Filed: May 25, 1984

[30] Foreign Application Priority Data

May 27, 1983 [FR] France .................... 83-08863

[51] Int. Cl.⁴ ........................................... A01D 39/00
[52] U.S. Cl. .......................................... 56/341; 100/88
[58] Field of Search .................. 56/17.1, 17.2, 341; 100/88

[56] References Cited

U.S. PATENT DOCUMENTS

| | | | |
|---|---|---|---|
| 2,568,822 | 9/1951 | Pervis | 56/17.2 |
| 2,882,977 | 4/1959 | Smith et al. | 56/17.1 |
| 3,063,226 | 11/1962 | Pfauser | 56/17.1 |
| 3,147,987 | 9/1964 | Ritoms | 56/17.2 |
| 3,572,012 | 3/1971 | Smith | 56/341 |
| 3,722,197 | 3/1973 | Vermeer | 56/341 |
| 3,968,633 | 7/1976 | Gaeddert et al. | 56/341 |
| 4,176,596 | 12/1979 | Sacht | 56/341 |
| 4,315,396 | 2/1982 | Oka et al. | 56/17.2 |
| 4,336,750 | 6/1982 | White et al. | 56/341 |
| 4,428,282 | 1/1984 | Anstey | 56/341 |
| 4,487,008 | 12/1984 | Terry | 56/17.2 |

FOREIGN PATENT DOCUMENTS 2219976 11/1973 Fed. Rep. of Germany .
7537082 1/1977 France .

Primary Examiner—Paul J. Hirsch
Attorney, Agent, or Firm—Thomas W. Speckman

[57] ABSTRACT

The invention relates to a lifting device for machines intended for the gathering and roll baling of all types of harvest, said machine comprising a frame on which is rotatably mounted at its lower part a cut hay pick-up member, said frame bearing at its upper part means defining a forming chamber for the round bale and being mounted on a pair of wheels in contact with the ground. The pick-up member is fixed relative to the hay bale-forming chamber and the wheels are mounted on the frame by means for regulating the height of the frame and the pick-up member relative to the ground. The invention is used for harvesting.

11 Claims, 3 Drawing Figures

LIFTING DEVICE FOR PICK-UP ROLL BALER MACHINES FOR ALL TYPES OF HARVESTING

FIELD OF THE INVENTION

The present invention relates to a lifting device for pick-up roll baler machines for all types of harvesting.

Agricultural machines are known which are intended for the harvesting of hay or of straw on the ground and its pressing in a chamber for the formation of a round or cylindrical bale which is then bound and ejected. These machines comprise a frame moving over the ground by means of two wheels and on which is rotatably mounted at its lower part a pick-up member for the cut hay, said frame bearing at its upper part means defining a chamber for the formation of round bales of hay.

The device used at present in this type of agricultural machine comprises a fixed frame and a pick-up member articulated with respect to the chamber for forming the bale. In this case, the fact of lifting up the pick-up member to respond to the various conditions of use (hay, straw) diminishes the intake of the material, which reduces the performance of the machine.

SUMMARY OF THE INVENTION

In accordance with the present invention, the pick-up member is fixed with respect to the forming chamber for the bale of hay and the wheels are mounted on the frame by means for regulating the height of the frame and the lifting member with respect to the ground.

This device enables an intake volume of the material to be baled to be obtained which is constant, which ensures an optimum yield, this constant volume being obtained by the fixed position from the pick-up member of the bearing roller and of the threshold roller.

The pick-up member being fixed with respect to the bale-forming chamber, the feed capacity does not vary, whatever the height of the teeth of the pick-up member with respect to the ground in operating position. In fact, adjustment of the height of the teeth is effected by lifting or by lowering the whole of the machine hydraulically.

Besides, the device according to the invention enables picking up of swathes with the machine in transport position when the machine is used on very wet ground (for example for the gathering of rice straw) without diminishing the pick-up capacity and without effecting special modifications on the machine.

BRIEF DESCRIPTION OF THE DRAWINGS

Other features and advantages of the invention will be better understood on reading the description which follows of an embodiment and with reference to the accompanying drawings, in which.

DESCRIPTION OF THE PREFERRED EMBODIMENTS

Figure 1:
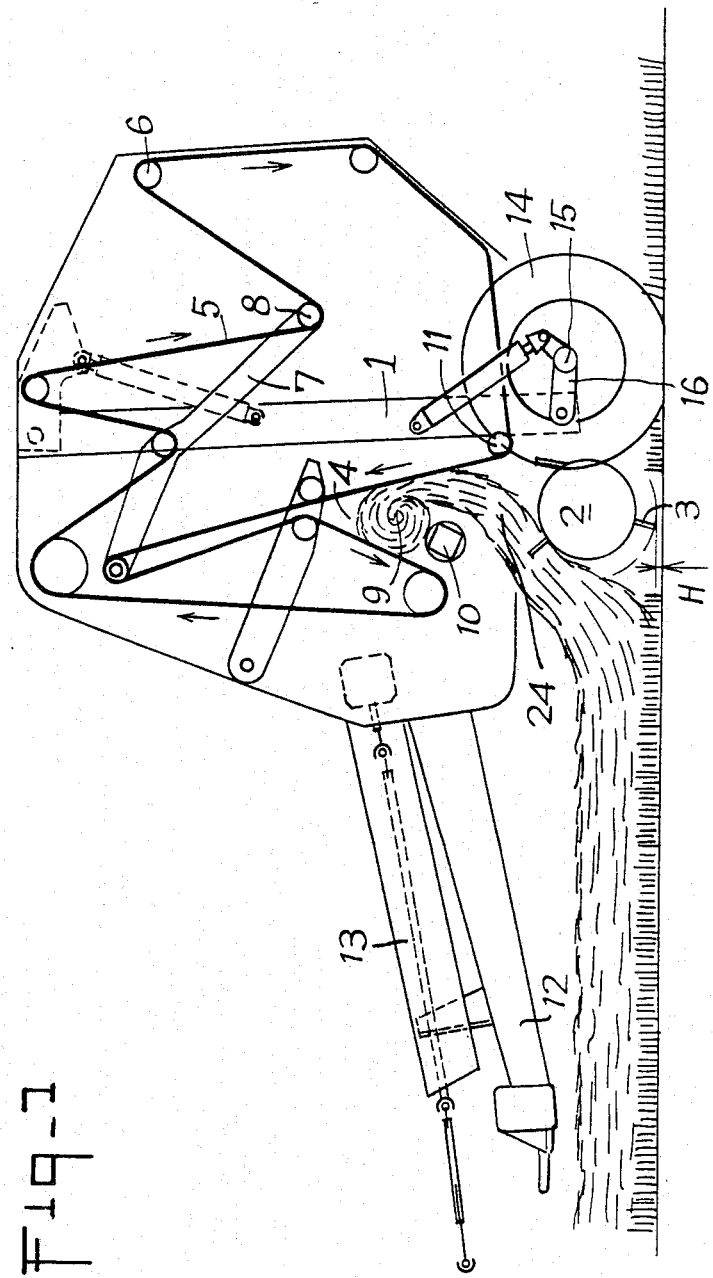
FIG. 1 is a view in elevation and in section of an embodiment of a pick-up and roll baler machine according to the invention in operating position.
Figure 2:
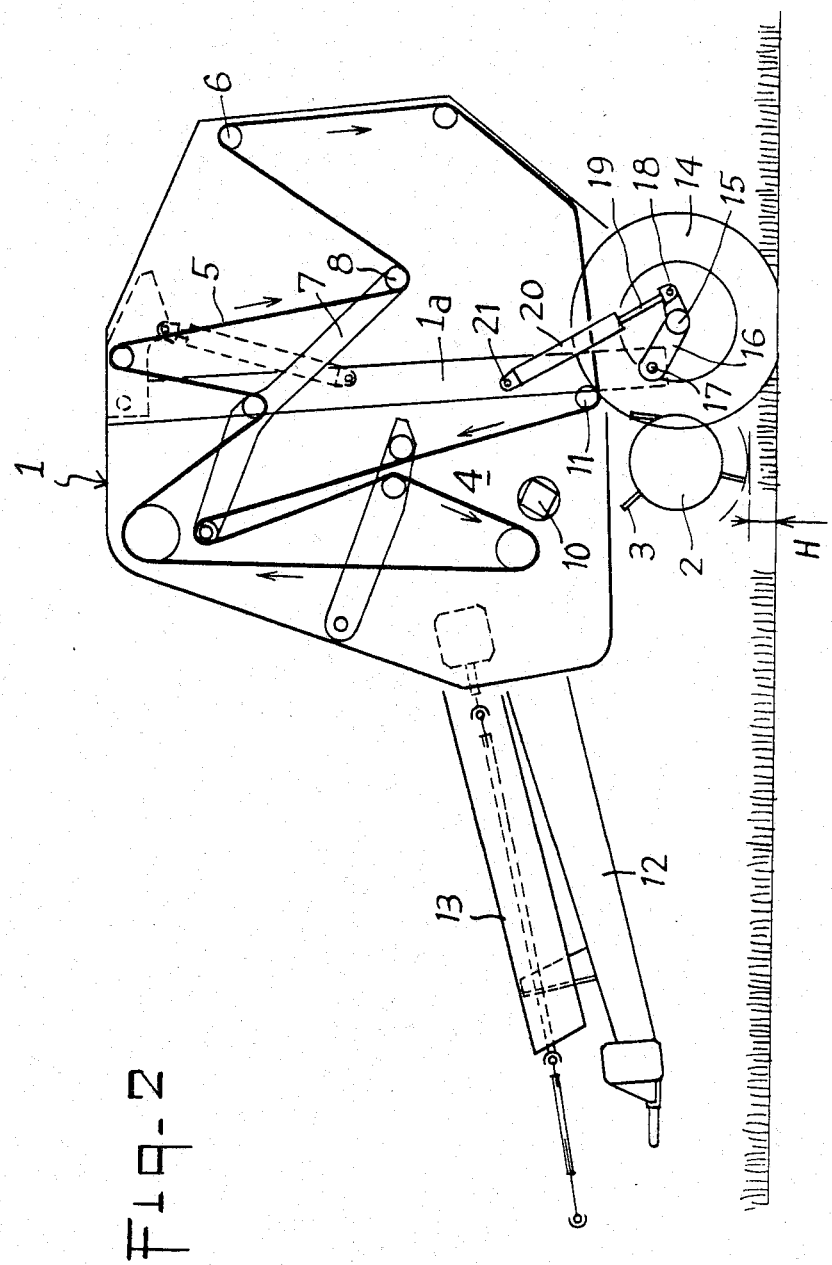
FIG. 2 is a similar view of the machine in road transport position.

In FIGS. 1 and 2, there is shown a machine intended for the pick-up and baling of round or cylindrical bales of hay and which comprises a frame 1 on which is rotatably mounted at its lower part a hay pick-up member constituted by a cylinder 2 which is provided on its periphery with teeth 3.

At its upper part, the frame 1 bears means defining a chamber 4 for the formation of a round bale of hay 9, said means being constituted by a flexible belt or by several flat endless straps 5 driven in translation and guided by rollers such as 6, certain of which 8 are mounted on levers 7 hinged on the base frame in order to permit the movement of said rollers progressively with the winding of the bale 9 and the increase in volume of the chamber 4 and the bale 9.

At the lower part of the chamber 4 are arranged a bearing roller 10 for the bale and a threshold roller 11, so that the pick-up member 2, 3 is fixed with respect to the chamber 4 for forming the bale.

At the front of the frame 1 is fixed a draftbar 12 by which the machine is coupled to a tractor which is connected by a rotary shaft 13 to the various members of the machine which is necessary to drive and through pipes to the hydraulic generator for pressurized fluid supplying the accessories of the machine and particularly the jacks.

The machine is moved over the ground by means of two wheels 14 arranged on each side of the machine. Each wheel 14 (FIGS. 1, 2 and 3) is rotatably mounted on a hub 15 fixed in the intermediate portion of an arm 16 of which one of the ends is pivotably mounted around an axle 17 on the lower part of an upright 1a of the frame and of which the other end is connected by a pivoting axle 18 to a yoke of a rod of a jack 19 whose body 20 is pivoted around an axle 21 on the upright 1a of the frame 1, said axle 21 being located at a level above the axle 17 for pivoting the arm 16 on the upright 1a of the frame.

The pivoting points 17, 18 of the arm on the frame and on the jack and the fastening point 15 of the hub to the arm are arranged at the points of a triangle. In addition, the device also comprises means for locking in position the frame 1 and the teeth 3 of the pick-up member, said means comprising a pin 22 which is engaged in holes formed in a side surface of the base frame (FIG. 3) or of a member of the base frame.

Figure 3:
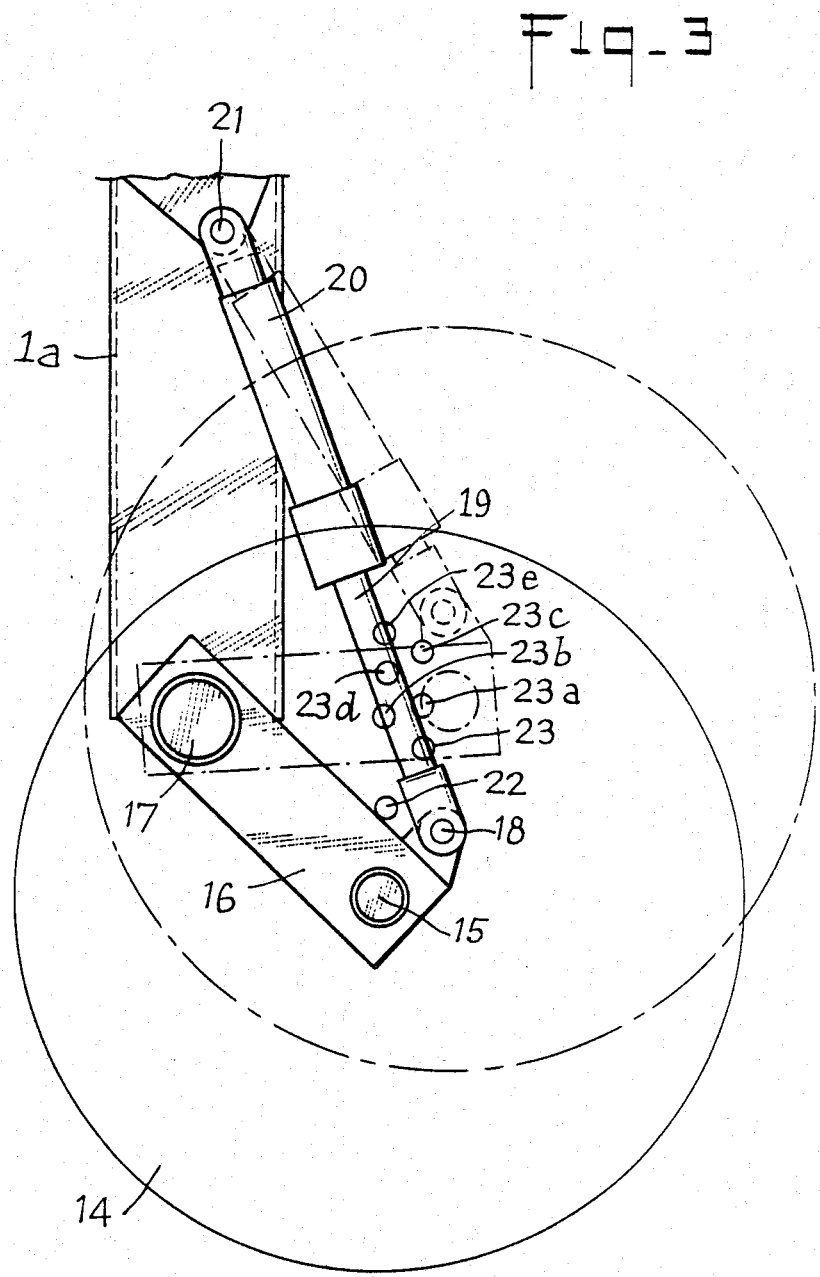
FIG. 3 is a view in elevation of the lifting and locking device for the wheels with respect to the frame.

In the position shown in FIG. 3, the pin 22 is engaged in a hole corresponding to the transport position of the machine and the arm 16 is in abutment against the pin 22.

The other holes 23 to 23e correspond to the engagement of the pin 22 for different operating positions and different heights of the teeth 3 of the pick-up member relative to the ground.

To adjust the height H of the teeth 3 of the pick-up member 2 in operating position (FIG. 1) or in transport position (FIG. 2), the hydraulic jacks 20 are placed in action which lower or lift the whole of the machine.

The pick-up member 2 being fixed with respect to the bearing roller 10 and the threshold roller 11, the intake volume of the material to be rolled up 24 is constant, which ensures optimum efficiency (FIG. 1).

In addition, the pick-up member 2 being fixed relative to the bale-forming chamber 4, the feed capacity does not vary, whatever the height of the teeth 3 relative to the ground in operating position (FIG. 1). In fact, adjustment of the height H of the teeth is effected by lifting or lowering the jacks of the whole machine.

The jacks 20 are supplied through the hydraulic circuit of the tractor and by means of a distributor of the tractor actuated from the control station.

When the adjustment of the height H of the teeth 3 of the pick-up member with respect to the ground is carried out, the required position is mechanically locked by means of the pin 22 which is engaged in one of the holes 23 to 23e (FIG. 3).

The locking pin 22 is positioned above the arm 16 in order to permit the raising of the machine to avoid an obstacle and thus not endanger the pick-up member. This operation is controlled from the tractor.

Although the description mentions hay it is obvious that the device can be used for all types of harvest.

Of course, the invention has been described by embodiments which are not to be taken as limiting and the technician skilled in the art will be able to contribute modifications thereto without however departing from the scope of the invention which is claimed.

We claim:

1. Pick-up roll baler machine for gathering and roll-baling cut agricultural crops, said machine comprising: a frame having mounted thereon means defining a forming chamber for forming a round bale of said cut crops and mounted on said frame at the lower portion of said forming chamber a bale bearing roller and a threshold roller; pick-up means for said cut crops rotatably mounted to the lower portion of said frame in fixed relation to said bearing roller and said threshold roller and in fixed relation to said forming chamber maintaining a constant sized opening to said forming chamber; and wheels adjustably mounted to said frame by adjustable mounting means capable of regulating the height of said frame and thereby said pick-up means relative to the bottom of said wheels.

2. The pick-up roll baler machine of claim 1 wherein each said wheel is rotatably mounted on a hub fixed to the intermediate portion of an arm pivotably mounted at one end to the lower part of said frame and coupled by articulated means at its other end to one portion of a hydraulic jack, the other portion of said hydraulic jack coupled by articulated means to said frame above said arm pivotable mounting to said frame.

3. The pick-up roll baler machine of claim 2 wherein said hub and said arm pivotal mounting to said frame and said arm pivotal mounting to said jack are positioned at the points of a triangle.

4. The pick-up roll baler machine of claim 3 wherein said arm bearing said wheel is in abutment against a mechanical locking means.

5. The pick-up roll baler machine of claim 4 wherein said mechanical locking means comprises a pin and holes in said frame at different vertical heights, said pin engaged in one of said holes to position said frame at different operating positions and at least one road transport position above the bottom of said wheels.

6. The pick-up roll baler machine of claim 2 wherein said arm bearing said wheel is in abutment against a mechanical locking means.

7. The pick-up roll baler machine of claim 6 wherein said mechanical locking means comprises a pin and holes in said frame at different vertical heights, said pin engaged in one of said holes to position said frame at different operating positions and at least one road transport position above the bottom of said wheels.

8. The pick-up roll baler machine of claim 1 wherein said adjustable mounting means bearing said wheels is in abutment against a mechanical locking means.

9. The pick-up roll baler machine of claim 8 wherein said mechanical locking means comprises a pin and holes in said frame at different vertical heights, said pin engaged in one of said holes to position said frame at different operating positions and at least one road transport position above the bottom of said wheels.

10. In a process for gathering and roll-baling cut agricultural crops the steps comprising: drawing a pick-up roll baler machine having a frame mounted on wheels over said cut crops; passing said cut crops to a forming chamber for forming a round bale of said crops by passing said cut crops over a pick-up means rotatably mounted to the lower portion of said frame and between a bale bearing roller and a threshold roller each mounted on said frame at the lower portion of said forming chamber, each said pick-up means, said bale bearing roller, and said threshold roller mounted to said frame in fixed relation to said forming chamber, thereby maintaining a constant sized opening to said forming chamber; and adjusting the height of said frame and thereby said pick-up means relative to the bottom of said wheels by activating adjustable mounting means adjustably mounting said wheels to said frame.

11. In the process of claim 10 wherein said step of adjusting the height of said frame comprises activating a hydraulic jack, one portion of said hydraulic jack coupled by articulated means to an arm pivotally mounted at one end to the lower part of said frame and having said wheel rotatably mounted on a hub fixed to its intermediate portion, the other portion of said hydraulic jack coupled by articulated means to said frame above said arm pivotal mounting to said frame.

* * * * *